United States Patent [19]

Sakakibara et al.

[11] Patent Number: 5,052,990
[45] Date of Patent: Oct. 1, 1991

[54] TRANSMISSION USING BALL AND SCREW MECHANICAL ACTUATORS

[75] Inventors: Shiro Sakakibara; Masahiro Hasebe, both of Aichi, Japan

[73] Assignee: Aisin AW Kabushiki Kaisha, Japan

[21] Appl. No.: 458,429

[22] Filed: Dec. 28, 1989

[30] Foreign Application Priority Data

May 1, 1989 [JP] Japan .................. 01-112700

[51] Int. Cl.⁵ .................. F16H 9/26; F16H 25/22
[52] U.S. Cl. .................. 475/210; 74/424.8 NA; 474/29
[58] Field of Search .......... 474/29, 37, 39; 475/6, 475/12, 149, 154, 208, 210, 295, 320, 321, 322, 332; 74/424.5, 424.7, 424.8 R, 424.8 NA

[56] References Cited

U.S. PATENT DOCUMENTS

| | | | |
|---|---|---|---|
| 3,190,414 | 6/1965 | Maurer et al. | 475/154 X |
| 3,850,050 | 11/1974 | Lemmens | 475/208 |
| 4,549,447 | 10/1985 | Sakakibara | 74/689 |
| 4,585,115 | 4/1986 | Lindblom et al. | 475/154 |
| 4,735,598 | 4/1988 | Moroto et al. | 474/29 |
| 4,790,212 | 12/1988 | Sibeud | 475/154 |
| 4,895,236 | 1/1990 | Sakakibara et al. | 192/84 R |

FOREIGN PATENT DOCUMENTS 63-g158353  7/1988  Japan .

Primary Examiner—Allan D. Herrmann
Assistant Examiner—Khoi Q. Ta
Attorney, Agent, or Firm—Lorusso & Loud

[57] ABSTRACT

A transmission provided in a power transmitting system and having at least a transmission mechanism and a forward/reverse rotation changeover mechanism controlled on the basis of signals from a control section. The transmission includes a plurality of mechanical actuators (e.g., ball screw mechanisms) capable of converting torques into thrust forces to operate the transmission operation mechanisms by the thrust forces, a motor (e.g., an electric motor) serving as a common torque generation source for the mechanical actuators, a divergence mechanism for distributing and transmitting a torque from the motor to the mechanical actuators, and a changeover mechanism for transmitting the torque distributed from the divergence mechanism to at least one of the mechanical actuators.

18 Claims, 7 Drawing Sheets

Fig. 6

| POSITION \ ELEMENT | | C1 | C2 | 62 | B1 | B2 | F |
|---|---|---|---|---|---|---|---|
| P | | | | | | | |
| R | | | | | ◯ | ◯ | |
| N | | | | | | | |
| D | L | ◯ | | ◯* | | | ◯ |
| D | H | ◯ | ◯ | ◯* | | | |
| S | L | ◯ | | ◯* | ◯ | | ◯ |
| S | H | ◯ | ◯ | ◯* | | | |

TRANSMISSION USING BALL AND SCREW MECHANICAL ACTUATORS

BACKGROUND OF THE INVENTION

This invention relates generally to transmissions and, more particularly, to a speed change operating device suitable for use in continuously variable speed transmissions mounted on vehicles. More specifically, this invention relates to a transmission in which a plurality of operating devices are operated by one motor.

The applicant of the present invention has recently proposed a continuously variable speed transmission based on the combination of a belt drive continuously variable speed transmission (CVT), a high/low speed mode changeover mechanism and a forward/reverse rotation changeover mechanism, which transmission is disclosed in Japanese Laid-Open Official Gazette for Patent Application No. 63-158353.

The high/low speed mode changeover mechanism of this transmission has two frictional engagement components, i.e., a high clutch and a low-coast and reverse brake, and a low one-way clutch. In a low-speed mode, the low one-way clutch or the low-coast and reverse brake are operated to make the planetary gear function as a simple reduction mechanism, and the torque transmitted from the belt drive continuously variable speed transmission is output through this reduction mechanism. In a high speed mode, the high clutch is operated to directly input the torque from the input shaft to a predetermined element of the planetary gear through a transfer device, and the torque from the belt drive continuously variable speed transmission and the torque from the transfer device are combined at the planetary gear before being output.

In this continuously variable speed transmission, the speed of the belt drive continuously variable speed transmission is changed by means of an electric motor and a ball screw mechanism, while the operation of the forward/reverse rotation changeover mechanism for changing over the forward clutch and the reverse brake and the operation of the high/low speed mode changeover mechanism for changing over the high clutch and the low-coast and reverse brake are effected with hydraulic actuators.

This continuously variable speed transmission requires an oil pump having a comparatively large capacity because the forward/reverse rotation changeover mechanism and the high/low speed mode changeover mechanism are actuated by the hydraulic actuators for the changeover operations. In particular, in the forward/reverse rotation changeover mechanism, a changeover N→D (neutral→range D) and a changeover N→R (neutral→reverse range) are effected when the vehicle is stopped, and it is therefore necessary to set the discharge pressure and the discharge rate of the oil pump to substantially high levels in order to obtain a hydraulic pressure high enough to maintain the necessary engagement pressure and engagement time of the forward clutch or the reverse brake during idling rotation of the engine. There is therefore a consideration risk of oil leaks. Also, the oil pump loss may become excessively large, which is undesirable in terms of efficiency.

The applicant of the present invention has also proposed a continuously variable speed transmission in which the forward/reverse rotation changeover mechanism and the high/low speed mode changeover mechanism are also operated by mechanical actuators consisting of electric motors and ball screw mechanisms (Japanese Patent Application No.63-291634).

This continuously variable speed transmission can be designed to avoid the above-mentioned problems due to hydraulic pressure but entails the problem of the large size and weight of the electric motors and drivers available based on the present technology. In particular, the provision of three motors and corresponding drivers for one continuously variable speed transmission increases the total size of the transmission and entails difficulty in layout.

SUMMARY OF THE INVENTION

It is therefore an object of the present invention to provide a transmission designed to avoid the above-mentioned problems by adopting a construction in which the torque of one motor is distributed to a plurality of operating sections.

To achieve this object, according to the present invention, there is provided a transmission disposed in a power transmitting system and having a plurality of transmission operation mechanisms controlled on the basis of signals from a control section, the transmission comprising a plurality of mechanical actuators (e.g., ball screw mechanisms) capable of converting torques into thrust forces to operate the transmission operation mechanisms by the thrust forces, a motor (e.g., an electric motor) serving as a common torque generation source for the mechanical actuators, a divergence means for distributing and transmitting the torque from the motor to the mechanical actuators, and a changeover means for transmitting the torque distributed from the divergence mechanism to at least one of the mechanical actuators.

The present invention includes specific arrangements described below.

That is, the divergence means may have a planetary gear having one element connected to the one motor and two other elements connected to the different mechanical actuators, and the changeover means may be brakes for suitably fixing the two elements.

The divergence means may be a direct power transmission means, and the changeover means may be clutches respectively interposed between the direct power transmission means and the plurality of mechanical actuators.

The transmission comprises a continuously variable speed transmission having a belt drive continuously variable speed transmission and a forward/reverse rotation changeover mechanism, and a plurality of transmission operation mechanisms operated by mechanical actuators to which torques are transmitted from the one motor.

Alternatively transmission comprises a continuously variable speed transmission having a belt drive continuously variable speed transmission, a forward/reverse rotation changeover mechanism and a high/low speed mode changeover mechanism, and the plurality of transmission operation mechanisms operated by the mechanical actuators to which torques are transmitted from the one motor.

In these arrangements, the torque of the motor is distributed by the divergence means. For example, in the case where the divergence means is a planetary gear set as shown in FIG. 1, the torque input to the one element (e.g., a ring gear) is distributed to the other two elements (e.g., a carrier and a sun gear) to be transmitted to the mating gears. If in this state one of the corresponding brakes is actuated, the whole of the input torque is transmitted to one of the gears, or if the other of the brakes is actuated, the whole of the input torque is transmitted to the other gear. In the case where the divergence means is a direct power transmission means, the torque is transmitted to one of the gears if one of the clutches is engaged or to the other gear if the other clutch is engaged. The torques of these gears are transmitted to the mechanical actuators (e.g., ball screw mechanisms) for the transmission operation mechanisms, and the mechanical actuators produce thrust forces to operate the transmission operation mechanisms as desired.

In the case where the transmission operation mechanisms are the belt drive continuously variable speed transmission and the forward/reverse rotation changeover mechanism, the torque of the motor is transmitted to the corresponding gears by being distributed by the divergence means when the driver effects a shift lever operation N→D or N→R. One of the mechanical actuators is thereby slid in one direction to change over the forward/reverse rotation changeover mechanism to forward running position (to connect the forward clutch) or to the backward running position (to establish engagement of the reverse brake). After this changeover, the changeover means is changed over to transmit a torque to the corresponding gear. The mechanical actuator is thereby operated to change the speed of the belt drive continuously variable speed transmission at the time of vehicle starting, thereby smoothly accelerating the vehicle and changing the transmission speed as desired.

In the case where the transmission operation mechanisms are the forward/reverse rotation changeover mechanism and the high/low speed mode changeover mechanism, the forward/reverse rotation changeover mechanism is operated as in the above when the driver effects the shift lever operation N→D or N→R. At the time of operation N→D, the operation of the forward/reverse rotation changeover mechanism alone may suffice. At the time of operation N→R, however, it is necessary to operate both the reverse brake of the forward/reverse rotation changeover mechanism and the low-coast and reverse brake of the high/low speed mode changeover mechanism. Accordingly, the two brakes are released to transmit torques to the two gears by using a planetary gear set as the divergence means, thereby transmitting torques distributed at a predetermined ratio to the mechanical actuators. If in this state one of the brakes (low-coast and reverse brake or the reverse brake) is engaged to thereafter inhibit the transmission of torque, the whole torque is transmitted to the direction of the other brake (the reverse brake or the low-coast and reverse brake). When a predetermined running state is reached after the vehicle has started running, the motor can be rotated for the speed change operation of the belt drive continuously variables speed transmission to transmit the torque to the corresponding gear through the divergence means and to thereby operate the high/low speed mode changeover mechanism as desired.

BRIEF DESCRIPTION OF THE DRAWINGS

FIG. 6 is a diagram of operations of respective elements in each range;

DESCRIPTION OF THE PREFERRED EMBODIMENTS

Embodiments of the present invention in which the invention is applied to continuously variable speed automatic transmissions for vehicles will be described below with reference to the accompanying drawings.

Figure 5:
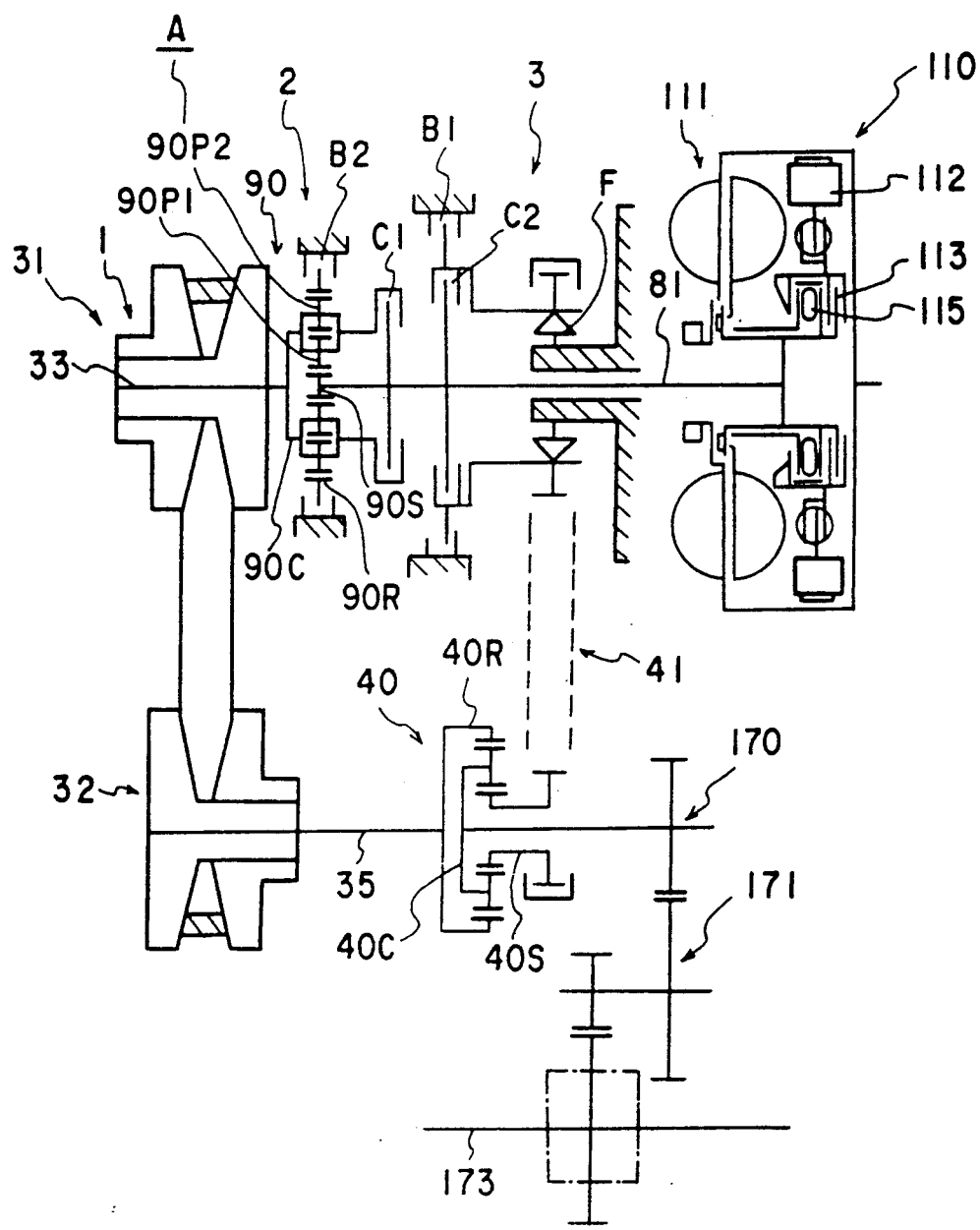
FIG. 5 is a schematic diagram of the construction of the embodiments of the present invention.

First, the construction of a continuously variable speed transmission in accordance with the present invention will be schematically described with reference to FIG. 5.

A continuously variable speed transmission A has a belt drive continuously variable speed transmission 1, a forward/reverse rotation changeover mechanism 2 including a dual planetary gear mechanism 90, a forward clutch C1 and a reverse brake B2, a single planetary gear mechanism 40, and a high/low speed mode changeover mechanism 3 including a high clutch C2, a low-coast and reverse brake B1 and a low one-way clutch F. The continuously variable speed transmission A further has a transfer device 41, an output component 170 consisting of a reduction gear 171 and other members, and a starting device 110 including a fluid coupling 111, a centrifugal lock-up clutch 112 and a slip clutch 113 having a cam mechanism.

In the single planetary gear mechanism 40, a ring gear 40R is coupled to a secondary shaft 35 of the belt drive continuously variable speed transmission 1. Also, a carrier 40C is coupled to the output component 170, and a sun gear 40S is connected through the transfer device 41 to the low one-way clutch F and the low-coast and reverse brake B1 constituting an engagement means and is also connected to an input shaft 81 through the high clutch C2.

In the dual planetary gear mechanism 90, a sun gear 90S is connected to the input shaft 81, a carrier 90C is connected to a primary shaft 33 of the belt drive continuously variable speed transmission 1 and to the input shaft 81 through the forward clutch C1, and a ring gear 90R is connected to the reverse brake B2.

In the thus-constructed transmission, the clutches C1 and C2, the brakes B1 and B2 and the low one-way clutch F operate in respective ranges, as shown in FIG. 6. A symbol indicates that the lock-up clutch 112 can be operated as desired by centrifugal force.

In more detail, in a low speed mode L of a range D, forward clutch C1 is connected and the low one-way clutch F is actuated. In this state, the torque of the engine crankshaft is transmitted to the input shaft 81 through the lock-up clutch 112 and the slip clutch 113 or through the fluid coupling 111 and is further transmitted directly to the sun gear 90S of the dual planetary gear mechanism 90 and to the carrier 90C through the forward clutch C1. Accordingly, the dual planetary gear mechanism 90 rotates integrally with the input shaft 81 to transmit a positive torque to the primary shaft 33 of the belt drive continuously variable speed transmission 1, and the torque of revolutions reduced as desired by the belt drive continuously variable speed transmission 1 is transmitted from the secondary shaft 35 to the ring gear 40R of the single planetary gear mechanism 40. On the other hand, under this condition, the sun gear 40S which is a reaction support element for receiving reaction force is stopped by the low one-way clutch F through the transfer device 41, and the torque of the ring gear 40R is therefore extracted as a reduced speed torque from the carrier 40C and is transmitted to an axle 173 through the reduction gear mechanism 171.

In a high speed mode H of the range D, the high clutch C2 is connected along with the forward clutch C1. In this state, as in the above, the positive torque of revolutions reduced as desired by the belt drive continuously variable speed transmission 1 is extracted through the secondary shaft 35 and is transmitted to the ring gear 40R of the single planetary gear mechanism 40. Simultaneously, the torque of the input shaft 81 is transmitted to the sun gear 40S of the single planetary gear mechanism 40 through the high clutch C2 and the transfer device 41, and the torques of the ring gear 40R and the sun gear 40S are combined by the planetary gear mechanism 40, thereafter being output through the carrier 40C. At this time, the torque against the reaction force is transmitted to the sun gear 40S through the transfer device 41, thereby transmitting the predetermined plus torque through the transfer device 41 without causing torque circulation. The combined torque from the carrier 40C is transmitted to the axle 173 through the reduction gear mechanism 171.

During operation in the range D, the power transmission is not effected based on the operation of the low one-way clutch F at the time of reverse torque application (at the time of engine braking). In contrast, in a range S, the power is transmitted even when a reverse torque is applied, because the low-coast and reverse brake B1 is actuated along with the low one-way clutch F.

In a range R, the reverse brake B2 is actuated along with the low-coast and reverse brake B1. In this state, the torque of the input shaft 81 is transmitted from the carrier C to the belt drive continuously variable speed transmission 1 as a reverse torque based on the condition that the ring gear 90R is fixed by the dual planetary gear mechanism 90. On the other hand, the sun gear 40S of the single planetary gear 40 is fixed by operation of the low-coast and reverse brake B1, and the reverse revolutions of the torque from the belt drive continuously variable speed transmission 1 are reduced by the single planetary gear mechanism 40 and the resulting torque is extracted through the output component 170.

An embodiment of the present invention will now be described below with reference to FIGS. 3 to 5.

The continuously variable speed transmission A has transmission cases $100_1$, $100_2$, $100_3$, and $100_4$ in the form of three-split covers on which the input shaft 81 and the primary shaft 33 of the belt drive continuously variable speed transmission 1 are supported coaxially and rotatably to constitute a first shaft, and on which the secondary shaft 35 of the belt drive continuously variable speed transmission 1 and a gear shaft 170a are supported coaxially and rotatably to constitute a second shaft. On the first axis are provided the starting device 110, components of the forward/reverse rotation changeover mechanism 2, i.e., the dual planetary gear mechanism 90, the forward clutch C1 and the reverse brake B2, components of the high/low speed mode changeover mechanism 3, i.e., the high clutch C2, the low-coast and reverse brake B1 and the low one-way clutch F, and a hydraulic pump 101. The single planetary gear mechanism 40 is provided on the second shaft.

The starting device 110 has the fluid coupling 111, the lock-up clutch 112 consisting of a centrifugal clutch, and the slip clutch 113. The slip clutch 113 has a cam mechanism 115 which produces an axial force corresponding to the load torque. The cam mechanism 115 operates to press a clutch plate and a disk of the slip clutch 113, thereby increasing the torque capacity of the slip clutch 113 according to the increase in the load torque.

The case 100 has a projecting portion 100a extending toward the input shaft 81 on the side of the engine. An input sprocket 42 of the transfer device 41 is supported on the projecting portion 100a through a bearing, and a hub of the sprocket 42 is connected to the projecting portion 100a through the low one-way clutch F. The input shaft 81 is connected, through the high clutch C2 consisting of a multi-disk clutch, to an inner peripheral surface of a flange 43 extending radially outwardly from the sprocket 42, and the low-coast and reverse brake B1 consisting of a multi-disk brake is interposed between an outer peripheral surface of the flange 43 and the case 100.

The sun gear 90S of the dual planetary gear mechanism 90 is spline-connected to a fore end portion of the input shaft 81, and a flange 91 extends therefrom radially outwardly. The primary shaft 33 of the belt drive continuously variable speed transmission 1 is fitted through a bush to the front end of the input shaft 81 in alignment with the same, and the carrier 90C is spline-connected to the shaft 33. First and second pinions 90P1 and 90P2 are supported on the carrier 90C, and the drum member 92 extending in the axial direction is provided thereon. The forward clutch C1 consisting of a multi-disk clutch is interposed between an inner diameter side of the drum member 92 and an outer diameter side of the flange 91 extending from the input shaft 81. The reverse brake B2 consisting of a multi-disk brake is interposed between the case 100 and an outer peripheral side of a support member to which the ring gear 90R is fixed.

An actuator 6 for the forward/reverse rotation changeover mechanism 2 and another actuator 7 for the high/low speed mode changeover mechanism 3 are disposed side by side between the section including the low-coast and reverse brake B1 and the high clutch C2 and the section including the reverse brake B2 and the forward clutch C1.

In this embodiment, the forward/reverse rotation changeover mechanism actuator 6 is an mechanical actuator which is driven by an electric motor 8 (refer to FIG. 1 or 2) in common with a later-described actuator 5 for the belt drive continuously variable speed transmission 1. The high/low speed mode changeover mechanism actuator 7 is a hydraulic actuator controlled by a hydraulic pressure supplied from the hydraulic pump 101. The mechanical actuator 6 comprises a ball screw mechanism having a female screw part 6a fixed to the case 100 with respect to the rotational and axial directions, and a male screw part 6b capable of moving rotatably and axially by turning within the female screw part 6a. A gear 61 is fixed to one end of the male screw part 6b, and a number of return disc springs 62 are disposed in a compressed state between the other end of the male screw part 6b and a snap ring 102 fixed to the case 100. An annular member 63 is connected to an inner peripheral surface of the male screw part 6b through a ball bearing. One end of the annular member 63 projects toward the reverse brake B2 to serve as a member for operating the brake B2, and a connection member 65 abuts against the other end integrally with the return disc springs 62. The connection member 65 extends radially inward and is connected and fixed at its extreme end to an outer race of a ball bearing 66 fitted around the input shaft 81. An inner end portion of a disc spring 67 for engagement of the forward clutch C1 abuts against an inner race of the ball bearing 66. The disc spring 67 is supported at its intermediate portion by a support member 69 which is fixed to the drum member 92 of the forward clutch C1. The disc spring 67 urges at its outer peripheral portion the forward clutch C1 to engage the same when no force is applied from the ball bearing 66 to the disc spring 67. The urging force of the return disc springs 62 is set to be larger than that of the disc spring 67. Accordingly, under a non-load condition (in home position) in which no torque acts on the ball screw mechanism 6, the return disc springs 62 prevail over the engagement disc spring 67 and maintain the forward clutch C1 in a released state while also maintaining the reverse brake B2 in a released state, thereby setting the transmission in a neutral position.

The high/low speed mode changeover mechanism actuator 7 has an annular cylinder member 71 fixed to the case 100. The cylinder member 71 is partitioned at its axially intermediate portion to form two cylinder chambers 71a and 71b on the left and right sides as viewed in FIG. 3. A piston 72 for operating the high clutch C2 is fitted in the left cylinder chamber 71a in an oil tight manner while a piston 73 for operating the low-coast and reverse brake B1 is fitted in the right cylinder chamber 71b. Return disc springs 74 are set in a compressed state between the backside of the high clutch C2 operating piston 72 and the snap ring 102 fixed to the case 100, with a connection member 75 interposed between the piston 72 and the springs 74. The piston 72 can be operated to axially move the connection member 75 integrally with itself against the disc springs 74. An inner circular end of the connection member 75 is connected and fixed to an outer race of a ball bearing 76 fitted around the input shaft 81 with a needle bearing interposed therebetween, while an inner end portion of a disc spring 77 for engagement of the high clutch C2 abuts against an inner race of the ball bearing 76. The engagement disc spring 77 is supported at its intermediate portion by a support member 78 to urge the high clutch C2 to connect the same when no force is applied from the ball bearing 76. In this case also, the urging force of the return disc springs 74 is set to be larger than that of the engagement disc spring 77. Accordingly, when no hydraulic pressure acts on the high clutch C2 operating piston 72, the return disc springs 74 prevail over the engagement disc spring 77 and maintain the high clutch C2 in a released state. A back surface of the low-coast and reverse brake B1 operating piston 73 abuts against the low-coast and reverse brake B1, and springs 79 are set in a compressed state between a back surface of the piston 73 and a fixing member 102 for outer frictional fixation of the brake B1 at a number of positions throughout the whole circumference thereof.

Figure 3:
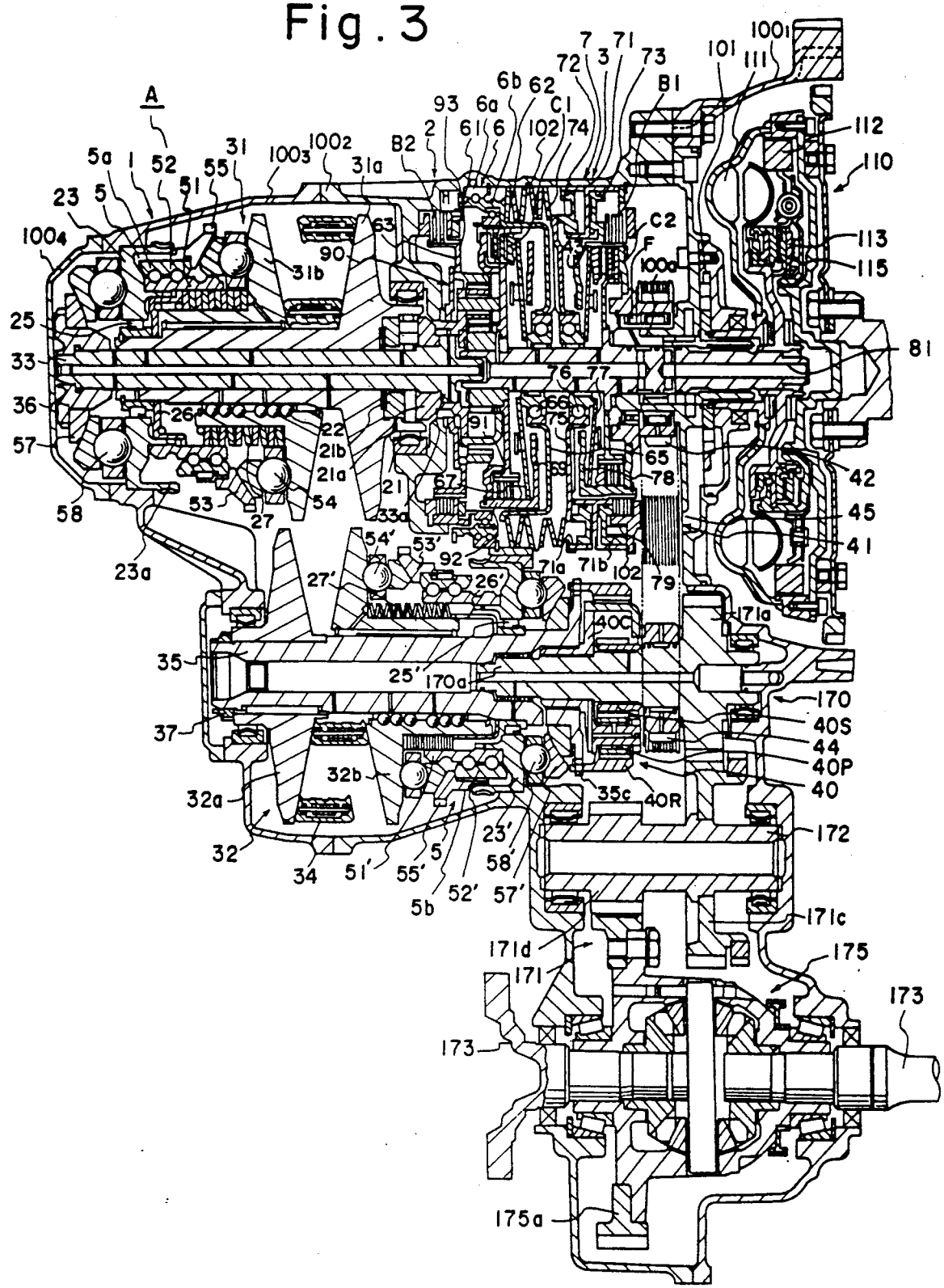
FIG. 3 is a cross sectional view of the whole of the continuous variable speed transmission in accordance with the embodiment shown in FIG. 1.
Figure 4:
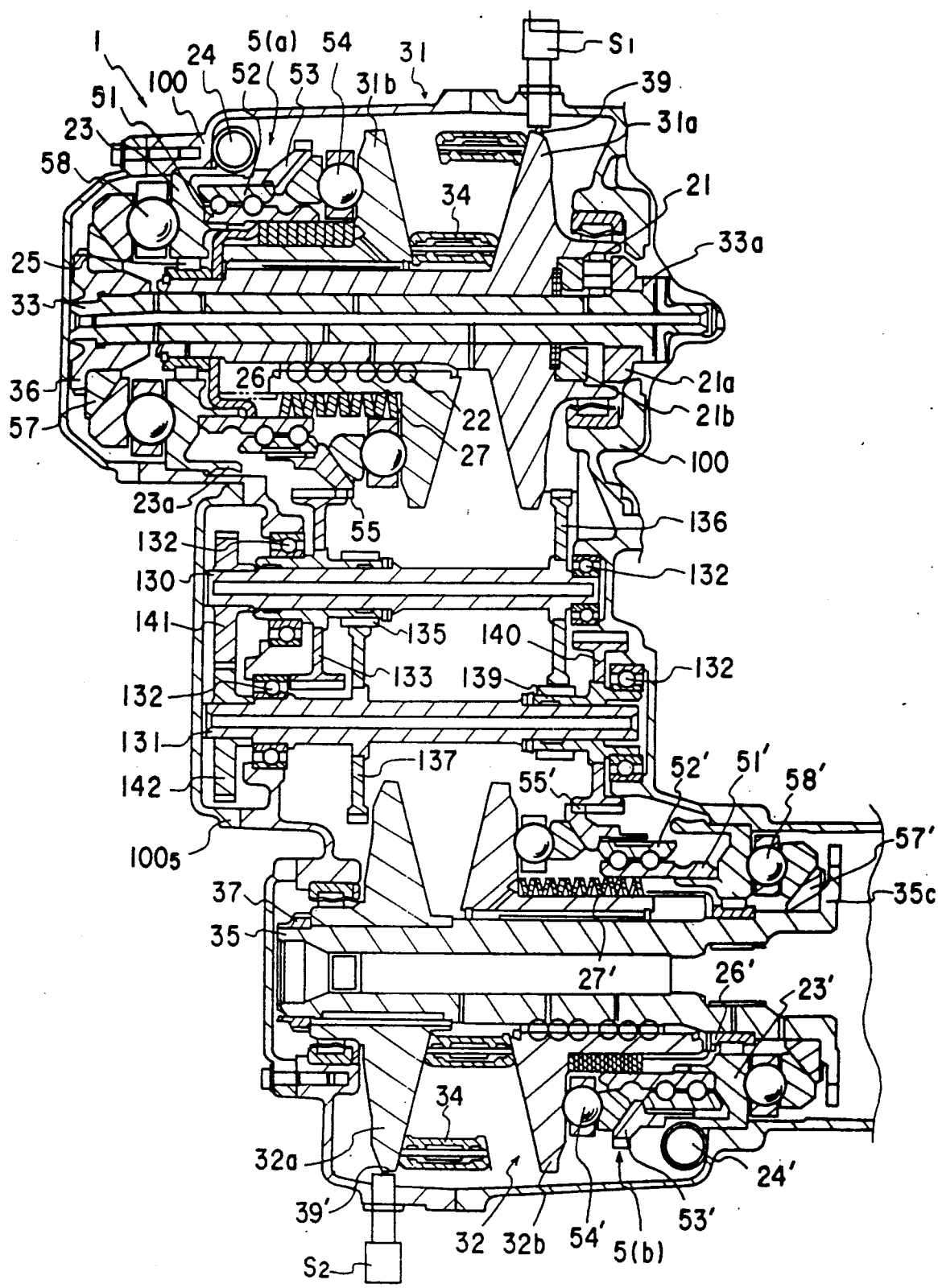
FIG. 4 is a development cross-sectional view of a belt drive continuous variable speed transmission shown in FIG. 3.

As illustrated in FIGS. 3 and 4 in detail, the belt drive continuously variable speed transmission 1 comprises a primary pulley 31, a secondary pulley 32 and a belt 34 wrapped around the pulleys 31 and 32. The pulleys 31 and 32 comprise fixed sheaves 31a and 32a and movable sheaves 31b and 32b. The belt 34 has a multiplicity of metallic pieces which contact the pulleys 31 and 32 in a lubricated state to transmit the torque. Accordingly, the friction between the metallic pieces and the pulleys 31 and 32 is comparatively small, and the angle of the contact surfaces of the belt pieces and the pulley 31 or 32 is set to an angle larger than the static frictional angle. The fixed sheave 31a of the primary pulley 31 is rotatably supported by a roller bearing on the case 100, and a base end portion of the primary shaft 33 extends radially outward to form a flange 33a. A pressure adjusting cam mechanism 21 is provided between the flange 33a and a back portion of the fixed sheave 31a.

The pressure adjusting cam mechanism 21 comprises a fixed side cam part 21a spline-connected to the primary shaft 33 and inhibited by the flange 33a from moving in the axial direction, a movable side cam part 21b spline-connected to the fixed sheave 31a and contacting the same under pressure with a disc spring interposed therebetween, and a roller interposed between the two cam parts 21a and 21b, thereby applying the axial force corresponding to the transmitted torque to the fixed sheave 31a. A boss portion of the fixed sheave 31a extends toward the movable sheave 31b and its inner peripheral surface is fitted around the primary shaft 33, while on its outer peripheral surface is supported a boss portion of the movable sheave 31b so as to be movable in the axial direction alone, with a multi-row ball spline mechanism (linear ball bearing) 22 interposed therebetween. That is, the movable sheave 31b is fitted around the boss portion of the fixed sheave 31a while contacting the same through balls alone without sliding frictional resistance.

A ball screw mechanism 5a constituting the mechanical actuator 5 is disposed on the back side of the movable sheave 31b. The ball screw mechanism 5a comprises a male screw part 51, a female screw part 52 and balls and is of a circulation type such that the balls are made to circulate through a return path. The ball screw mechanism 5a is based on a single screw, and a recessed groove for about one turn and a return path of a coma type are formed in the female screw part 52. The male screw part 51 is longer than the female screw part 52 in the axial direction, and a rear end portion of the male screw part 51 is fixed to an adjustable intermediate member 23 supported on a shoulder portion of the case 100 while being restrained in the axial and radial directions. The primary shaft 33 is rotatably supported on the adjustable intermediate member 23 by means of a roller bearing 25, with an inner cylindrical portion of the boss portion of the fixed sheave 31a facing the bearing. The adjustable intermediate member 23 has a worm wheel 23a formed in its outer peripheral portion is rotated based on the operation of a worm 24 meshing with the wheel 23a to rotate the male screw part 51 relative to the female screw part 52, thereby enabling the initial tension and the running center of the belt 34 to be adjusted. An automatic aligning mechanism 53 is fixed to the female screw part 52 with a key, and a thrust ball bearing 54 is interposed between the automatic aligning mechanism 53 and the backside of the movable sheave 31b. The automatic aligning mechanism 53 has a projecting portion which extends obliquely along a spherical support surface and which has a gear 55 formed in its projecting end portion. Between the backside of the movable sheave 31b and a support plate 26 which is prevented from moving in the axial direction by an inner race of the roller bearing 25 held by the adjustable intermediate member 23, an elastic urging member 27 is provided which consists of a predetermined number of disc springs and which carries part of the belt clamping load so as to reduce the support load imposed on the ball screw mechanism 5a and the thrust ball bearing 54. A flange 36 is fixedly screwed to a fore end portion of the primary shaft 33 and another automatic aligning mechanism 57 is fixed to the flange 36. Between the automatic aligning mechanism 57 and the backside of the adjustable intermediate member 23 is interposed a thrust ball bearing 58 which has a number of balls held in a cage, and a race on one side. On the other hand, the fixed sheave 32a of the secondary pulley 32 is supported on the case 100 by a roller bearing so as to be rotatable integrally with the secondary shaft 35. A boss portion of the movable sheave 32b is slidably fitted to the secondary shaft 35 with only balls of a ball spline similar to the above-described ball spline interposed therebetween. A ball screw mechanism 5b constituting the same mechanical actuator 5 as previously described is arranged on the backside of the movable sheave 32b. A male screw part 51' of the ball screw mechanism 5b is fixed to an adjustable intermediate member 23' similar to the adjustable intermediate member 23. Accordingly, the adjustable intermediate member 23' supports the secondary shaft 35 through a roller bearing 25' and serves, in association with the adjustable intermediate member 23 on the side of the primary shaft, to adjust the initial tension and the running center line of the belt 34 on the basis of the rotation of a worm 24'. As on the primary shaft, an automatic aligning mechanism 53' is fixed to a female screw part 52' of the ball screw mechanism 5b, and a thrust ball bearing 54' is interposed between the automatic aligning mechanism 53' and the backside of the movable sheave 32b. The automatic aligning mechanism 53' has a projecting portion which extends obliquely along a spherical support surface, and which has a gear 55' formed in its projecting end portion. Further, an elastic urging member 27' similar to that provided on the side of the primary shaft is disposed between the backside of the movable sheave 32b and a support plate 26' fixed to the secondary shaft 35.

The secondary shaft 35 is increased in diameter at its base end and a hole for receiving a gear shaft/70a is formed in the increased diameter portion. This diameter-increased shaft portion is extended radially outwardly at its extreme end to form a flange 35c. The fixed sheave 32a is fitted to a fore end portion of the secondary shaft 35 with a key interposed therebetween, and a nut 37 is screwed into this portion to prevent the fixed sheave 32a from being dismounted. As on the side of the primary shaft, an automatic aligning mechanism 57' having a convex spherical support surface is fixed to the flange 35c. Between the automatic aligning mechanism 57' and the backside of the adjustable intermediate member 23' is interposed a thrust ball bearing 58' which has balls directly abutting against the backside of the adjustable intermediate member 23', and a race having a spherical concave surface which is in tight contact with the spherical support surface.

As indicated by reference symbols 39 and 39' in FIG. 4, grooves to be detected are formed in extreme end portions of the fixed sheaves 31a and 32a on the sides of the primary and secondary shafts. The grooves 39 and 39' are counted with electromagnetic sensors $S_1$ and $S_2$ to detect the respective rotational speeds of the primary and secondary shafts 33 and 35.

As illustrated in FIG. 4, first and second countershafts 130 and 131, which are supported by bearings 132, 132 ... on the case 100, are disposed where a triangle is formed by the primary and secondary shafts 33 and 35. A gear unit having a large gear 133 and a small gear 135 is rotatably supported on the first countershaft 130, and another large gear 136 is integrally connected to this shaft at one end thereof. A large gear 137 is integrally fixed to the second countershaft 131 and a gear unit having a small gear 139 and a large gear 140 is rotatably supported on this shaft at the corresponding end. Further, non-circular gears 141 and 142 capable of meshing with each other are respectively fixed to end portions of the countershafts 130 and 131 protruding beyond the bearings 132 to be moved while being interlocked in a non-linear relationship. The non-circular gears 141 and 142 are covered with a protective cover 100₅ fixed to the case 100.

In the gear unit rotatably supported on the first countershaft 130, the large gear 133 meshes with the gear 55 of the ball screw mechanism 5a on the primary side and with a gear 16 (refer to FIG. 1 or 2) connected to the later described electric motor 8, and the small gear 135 meshes with the large gear 137 fixed to the second countershaft 131, thereby constituting a speed increasing mechanism in a transmission path from the second countershaft 131 (a speed reducing mechanism in a transmission path from the gear 55 of the ball screw mechanism 5a). In the gear unit rotatably supported on the second countershaft 131, the large gear 140 meshes with the gear 55' of the ball screw mechanism 5b on the secondary side, and the small gear 139 meshes with the large gear 136 fixed to the first countershaft 130, thereby constituting a speed increasing mechanism in a transmission path from the first countershaft 130 (a speed reducing mechanism in a transmission path from the gear 55' of the ball screw mechanism 5b). The gears 55 and 55' connected to the female screw parts 52 and 52' of the ball screw mechanisms 5a and 5b have a small thickness, and the large gears 133 and 140 of the gear units supported on the countershafts 130 and 131 have a large thickness such that they can be maintained in the meshed relationship with the thin gears 55 and 55' even when the ball screw mechanisms 5a and 5b are moved by full strokes in the axial direction.

Figure 1:
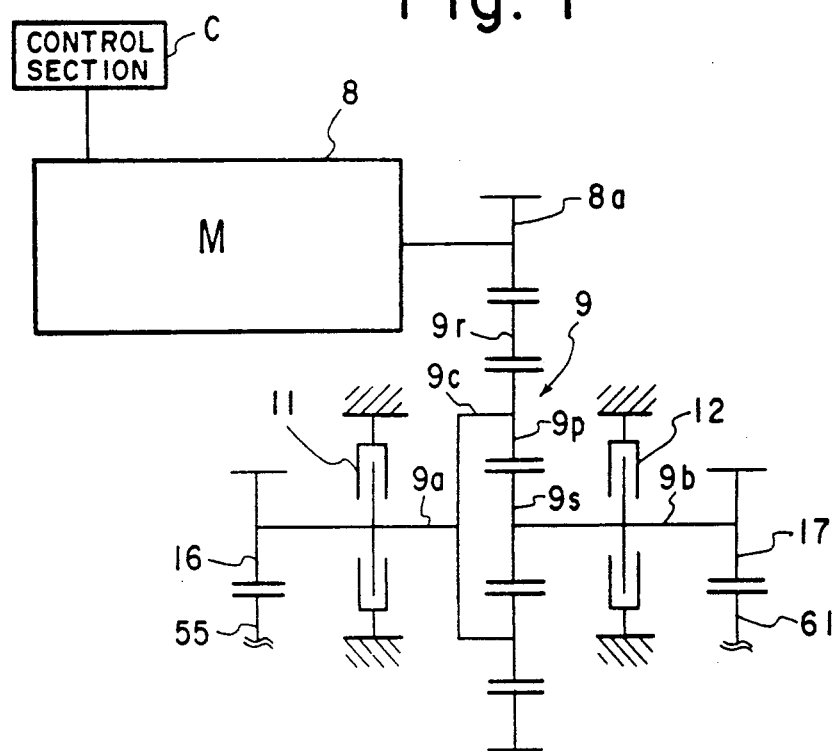
FIG. 1 is a schematic diagram of a divergence means in accordance with an embodiment of the present invention.

As shown in FIG. 1, one electric motor 8 for the continuously variable speed transmission and for the forward/reverse rotation changeover mechanism is disposed outside the case 100 at a suitable position. The electric motor 8 consists of a rotating magnetic field motor, such as a commutator motor or a step motor, or a different type of electric motor such as a servo motor or an ultrasonic motor. The electric motor 8 has an output gear 8a through which the torque is transmitted to a predetermined element of a single planetary gear 9 which constitutes a divergence means. The planetary gear 9 includes a ring gear 9r, a sun gear 9s, a pinion 9p meshing with the gears 9r and 9s, and a carrier 9c supporting the pinion 9p. The output gear 8a meshes with a gear formed in an outer peripheral surface of the ring gear 9r. The carrier 9c is connected to a first shaft 9a which extends in one direction and on which a gear 16 is provided, and a first brake 11 is provided at an intermediate portion of the shaft 9a. The sun gear 9s is connected to a second shaft 9b which extends in the other direction and on which a gear 17 is provided, and a second brake 12 is provided at an intermediate portion of the shaft 9b.

The first and second brakes 11 and 12 are, preferably, electromagnetic brakes controlled by electrical signals from a control section C but they may be other types of brakes such as hydraulic brakes. The gear 16 always meshes with the gear 55 of the ball screw mechanism 5b serving as the actuator for the belt drive continuously variable speed transmission 1, while the gear 17 always meshes with the gear of the ball screw mechanism serving as the actuator 6 for the forward/reverse rotation changeover mechanism 2. The gear with which the gear 16 meshes is not limited to only the gear 55 of the ball screw mechanism 5a on the primary side; it may be made to mesh with the gear 55' of the ball screw mechanism 5b on the secondary side or the gear 133 or 139 of the countershaft 130 or 131. That is, any arrangement may suffice so long as the torque is transmitted to the gear train to continuously change the speed.

The transmission paths from the electric motor 8 to the actuators 5 and 6 and the linking transmission paths of the ball screw mechanisms 5a and 5b on the primary and secondary sides of the belt drive continuously variable speed transmission 1 are constituted by helical spur gears, and reversible transmission can therefore be effected through these paths with improved efficiency.

As illustrated in FIG. 3, the single planetary gear mechanism 40 of the high/low speed mode changeover mechanism is disposed on the gear shaft 170a constituting the second shaft, with its ring gear 40R connected to the flange 35c of the secondary shaft 35. A sprocket 44 is rotatably supported on the gear shaft 170a integrally with the sun gear 40S, and the carrier 40C on which a pinion 40P is rotatably supported is fixed to the gear shaft 170a.

A silent chain 45 is wrapped around the sprocket 44 integral with the sun gear 40S on the second shaft and the sprocket 42 supported on the low one-way clutch F. The sprockets 42 and 44 and the chain 45 constitute the transfer device 41.

A gear 171a is integrally formed on the gear shaft 170 to constitute the output member 170. The gear 171a meshes with a gear 171c fixed to an intermediate shaft 172. A small gear 171d is formed on the intermediate shaft 172 to mesh with a ring gear 175a fixed to a differential gear mechanism 175, thereby constituting a reduction mechanism 171. The front axles 173 extend from the differential gear mechanism 175 to the left and right.

The operation of the present invention will be described below.

When the engine is started, the electric motor 8 is in the home position, and both the forward clutch C1 and the reverse brake B2 are in the released states. Also, no hydraulic pressure is produced by the pump 101, and the high clutch C2 and the low-coast and reverse brake B1 are in the released states. At this time, therefore, there is no possibility of the torque of the engine being transmitted to the output member 170 even if a malfunction of the electric system, e.g., disconnection occurs.

When the driver moves the shift lever from the neutral position N to the position of the range D after the engine has been started, the first brake 11 of the changeover mechanism is first actuated and the second brake 12 is released. If in this state the electric motor 8 is rotated in a predetermined direction from the home position, the torque of this rotation is transmitted to the ring gear 9r of the single planetary gear 9 through the output gear 8a, and the torque of the ring gear 9r is entirely transmitted to the gear 17 through the shaft 9b because the carrier 9c is fixed by the operation of the first brake 11. The torque of the gear 17 is transmitted to the male screw part 6b of the ball screw mechanism 6 for the forward/reverse rotation changeover mechanism through the gear 61, thereby moving the male screw part 6b against the return disc springs 62 to the right as viewed in the figures. The urging force of the return disc springs 62 acting on the inner peripheral end of the engagement disc spring 67 through the annular member 63, the connection member 65 and the ball bearing 66 is thereby reduced, and the engagement disc spring 67 smoothly connects the forward clutch C1 by its urging force. While the forward clutch C1 is positively connected, the second brake 12 is actuated for the stopping action, and the electric motor 8 is stopped. At this time, no hydraulic pressure is supplied to the hydraulic actuator 7 for the high/low speed mode changeover mechanism.

During this operation, the torque of the engine crankshaft is transmitted to the input shaft 81 through the fluid coupling 111 at the time of vehicle starting and, thereafter, through the lock-up clutch 112 and the slip clutch 113. From the torque of the input shaft 81, a positive torque of the integral rotation of the carrier 90C and the sun gear 90S in the dual planetary gear mechanism 90 is obtained by the engagement of the forward clutch C1 based on the forward/reverse rotation changeover mechanism actuator 6 and is transmitted to the fixed cam part 21a of the pressure adjusting cam mechanism 21.

The torque transmitted to the fixed cam part 21a of the pressure adjusting cam mechanism 21 is transmitted to the movable sheave 31b of the primary pulley 31 through the roller and the movable cam part 21b while an axial force corresponding to the transmitted torque is applied to the fixed sheave 31a. Thus, the axial force corresponding to the transmitted torque is transmitted throughout the whole of the belt drive continuously variable speed transmission 1 related through the belt 34. Further, the torque of the fixed sheave 31a is transmitted to the movable sheave 31b through the ball spline 22 to clamp the belt 34 by the axial force based on the pressure adjusting cam mechanism 21, and is transmitted to the secondary pulley 32 through the belt 34. At this time, the axial reaction force of the belt 34 is applied to the fixed sheave 31a and the movable sheave 31b, but the axial force from the fixed sheave 31a is received by the flange 33a of the primary shaft 33 through the pressure adjusting cam mechanism 21. The axial force from the movable sheave 31b is received by the flange 36 fixed to the primary shaft 33 through the thrust ball bearing 54, the automatic aligning mechanism 53, the ball screw mechanism 5a in a predetermined condition, the adjustable intermediate member 23, the thrust ball bearing 58 and the automatic aligning mechanism 57. Thus, the axial forces are received by a close loop in which they act as a tensile force on the primary shaft 33. A part of the axial force acting on the movable sheave 31b is directly applied from the sheave backside to the primary shaft 33 through the elastic urging member 27 and the support plate 26, thereby reducing the axial force acting on the thrust ball bearings 54 and 58 and the ball screw mechanism 5a.

The torque from the belt 34 is transmitted to the secondary pulley 32 and then to the secondary shaft 35 through the ball spline. At this time, as on the side of the primary shaft, the axial reaction force acting on the fixed sheave 32a of the secondary side is also directly received by the secondary shaft 35 with the nut 37, while the axial reaction force acting on the movable sheave 32b is received by the thrust ball bearing 54', the ball screw mechanism 5b, the adjustable intermediate member 23', the thrust ball bearing 58' and the flange 35c. Also, a part of the axial force acting on the movable sheave 32b is directly received by the secondary shaft 35 through the elastic urging member 27' and the support plate 26'.

If the control section C issues a speed change command according to the speed change ratio of the belt drive continuously variable speed transmission based on the outputs from the sensors $S_1$ and $S_2$ and the driver's speed demand based on the vehicle speed, the throttle opening and so on, the first brake 11 is released while the second brake 12 is maintained in the actuated state, and the electric motor 8 is rotated in a predetermined direction. The torque of the ring gear 9r transmitted from the output gear 8a is entirely transmitted to the shaft 9a through the carrier 9c because the sun gear 9s is fixed by the second brake 12, thereby rotating the gear 16 in a predetermined direction. The torque of the gear 16 is transmitted to the gear 55 of the ball screw mechanism 5a of the belt drive continuously variable speed transmission 1 meshing with the gear 16, and the female screw part 52 integral with the gear 55 thereby moves axially while rotating to move the movable sheave 31b through the thrust ball bearing 54 and to thereby change the effective diameter of the belt portion on the primary pulley 31.

On the other hand, from the torque of the gear 55, the torque of revolutions greatly reduced in the gear units by the large gear 133 and the small gear 135 constituting the gear unit and the large gear 137 meshing with this small gear is transmitted to the second countershaft 131 and then to the first countershaft 130 through the non-circular gears 142 and 141. From the torque of the first countershaft 130, the torque of revolutions increased by the large gear 136 and the gear unit having the small gear 139 and the large gear 140 is obtained through the large gear 140 and is transmitted to the gear 55' of the ball screw mechanism 5b on the secondary side. By the torque of the gear 55', the female screw part 52' integral therewith rotates relative to the fixed male screw part 51' to move axially and, hence, to move the movable sheave 32b through the thrust ball bearing 54', thereby changing the effective diameter of the belt portion on the secondary pulley 32. At this time, the extents of movement of the primary and secondary pulleys 31 and 32 do not linearly correspond to the extent of movement of the belt 34, but the difference therebetween is suitably absorbed by the transmission through the non-circular gears 141 and 142.

The number of revolutions of the non-circular gears 141 and 142 is limited to one or less because of their specific construction. However, the non-circular gears 141 and 142 are disposed in association with the first and second countershafts 130 and 131 of reduced revolutions for linkage to the gears 55 and 55' of increased revolutions on the primary and secondary sides, thereby enabling a number of revolutions of each of the ball screw mechanisms 5a and 5b while the non-circular gears 141 and 142 make one revolution or less. Predetermined strokes of the ball screw mechanisms 5a and 5b are thereby obtained with predetermined leads.

The ball screw mechanisms 5a and 5b on the primary and secondary sides are reversible transmission mechanisms capable of converting torques into axial forces as well as converting axial forces into torques. Moreover, the female screw parts 52 and 52' of the ball screw mechanisms 5a and 5b are moved in the linked relationship by the reversible transmission mechanism constituted by spur gears or helical gears, thereby enabling the axial force applied from the belt 34 to the secondary pulley 32 to be transmitted and converted into an axial force of the primary pulley 31 through the reversible transmission mechanism. Substantially no axial movement resistance of the movable sheave 31b is therefore exhibited by the effect of the ball spline 22 with respect to the axial force applied from the ball screw mechanism 5a on the primary side to the movable sheave 31b at the time of speed changing. Also, based on the reversible transmission, this axial force may be, at most, as large as the difference between the clamping forces applied from the primary and secondary pulleys 31 and 32 to the belt 34. An electric motor having a small torque capacity may therefore suffice for use as the electric motor 8, and it is possible to perform the shifting operation at a high speed. Also, the pressure adjusting cam mechanism 21 is not required to have a force for the movable sheave 31b movement resistance and may be designed for generating only a comparatively small axial force. It is therefore possible to use one common motor for the motor of the forward/reverse rotation changeover mechanism actuator 6 having a comparatively small capacity and the motor of the continuous speed change actuator 5. In this case, the gear ratios of the planetary gear 9 and the gears 16, 17, 55, and 61 are set according to the necessary strokes and axial forces of the continuous speed change actuator 5 and the forward/reverse rotation changeover mechanism 6.

The torque of the secondary shaft 35 is transmitted from the flange 35c to the ring gear 40R of the single planetary gear mechanism 40, and the torque of revolutions reduced by the planetary gear mechanism 40 in the above-described manner is transmitted to the gear shaft 170a. Further, the torque of the gear shaft 170a is transmitted to the differential gear mechanism 175 through the reduction device 171 and, hence, to the left and right front axles 173.

When the driver moves the shift lever from the position N to the position R, the electric motor 8 is rotated from the home position in the direction opposite to that in the above-described case. For this operation, the shift lever has been returned and temporarily set to the neutral position N while the belt drive continuously variable speed transmission 1 is maintained in the minimum speed position and, while the vehicle is stopped. When driving of the electric motor 8 is started, the second brake 12 is released while the first brake 11 is maintained in the engaged state, and the torque of the output gear 8a is transmitted to the gear 17 through the planetary gear 9 and further to the male screw part 6b of the ball screw mechanism 6 for the forward/reverse rotation changeover mechanism through the gear 61, as in the above case. The male screw part 6b is thereby moved to the left as viewed in the figures to effect engagement of the reverse brake B2 by pressing the projecting portion of the annular member against the brake B2. The ring gear 90R of the dual planetary gear mechanism 90 is thereby fixed and the torque of the sun gear 90S is extracted as a reverse torque at the carrier 90C and is transmitted to the primary shaft 33 of the belt drive continuously variable speed transmission 1.

By the operation N→R by the driver, a hydraulic pressure is supplied to the right cylinder chamber 71b of the high/low speed mode changeover mechanism hydraulic actuator 7. Then the piston 73 fitted in the cylinder chamber 71b is extended to engage with the low-coast and reverse brake B1. The input-side sprocket 42 of the transfer device 41 is thereby fixed irrespective of the rotational direction thereof even though the sun gear 40S of the single planetary gear mechanism 40 is rotated in the reverse direction.

When the vehicle speed is increased to a predetermined high speed and when a high speed mode changeover command is issued from the control section C, a hydraulic pressure is supplied to the left cylinder chamber 71a of the high/low speed mode changeover mechanism actuator 7. Then the piston 72 compresses the return disc springs 74 to reduce the urging force of the return disc springs 74 acting on the inner peripheral end of the engagement disc spring 77 through the connection member 75 and the ball bearing 76. The engagement disc spring 77 therefore smoothly connects the high clutch C2 by its urging force. The cylinder chamber 71a is formed in a fixed portion of the cylinder member 71 fixed to the case 100, and the hydraulic pressure can be smoothly increased through an orifice to smoothly connect the high clutch C2. Although in the high speed mode the cylinder chamber 71a is supplied with a certain hydraulic pressure and the high clutch C2 is rotated, there is substantially no risk of oil leakage and the desired oil supply state can be maintained. In this state, the torque of the input shaft 81 is transmitted to the transfer device 41 through the high clutch C2 and then to the sun gear 40S of the single planetary gear mechanism 40. The torque from the belt drive continuously variable speed transmission 1 and the torque obtained through the transfer device 41 are combined by the single planetary gear mechanism 40, thereafter being extracted through the gear shaft 70a.

To smoothly perform the overall operation, it is preferable to operate the belt drive continuously variable speed transmission 1 to a predetermined extent for a downshift at the time of changeover from a low speed to a high speed using the high/low speed mode changeover mechanism 3, or to a predetermined extent for an upshift at the time of changeover from a high speed to a low speed. However, the continuous speed change operation can be performed without any difficulty because the speed change operation is effected by means of the electric motor 8 provided for the operating system separate from that of the high/low speed mode changeover mechanism actuator 7.

In a case where the driver moves the shift lever from the neutral position N to the position of the range S or from the range D to the range S, a hydraulic pressure is supplied to the right cylinder chamber 71b of the high/low speed mode changeover mechanism actuator 7 to maintain the low-coast and reverse brake B1 in the engaged state, as in the above. In the range S also, the continuous speed change operation can be performed in the same manner as in the range D, and changeover to the low-speed mode or high speed mode can be effected by supplying hydraulic pressure to the cylinder chamber 71a or 71b or draining.

Under non-operating conditions in which the forward/reverse rotation changeover mechanism 2 is maintained in the predetermined forward position or reverse rotation position and in which the belt drive continuously variable speed transmission 1 is maintained in the state of a selected speed, the brakes 11 and 12 are maintained in the engaged state and the gears 16 and 17 are fixed to the predetermined positions. There is therefore no need for any special engagement means such as an electromagnetic brake for maintaining the electric motor 8 in a predetermined condition although a reverse torque acts on the electric motor 8 from the actuator 5 or 6 owing to the use of the reversible transmission mechanism based on spur gears or the like.

Figure 2:
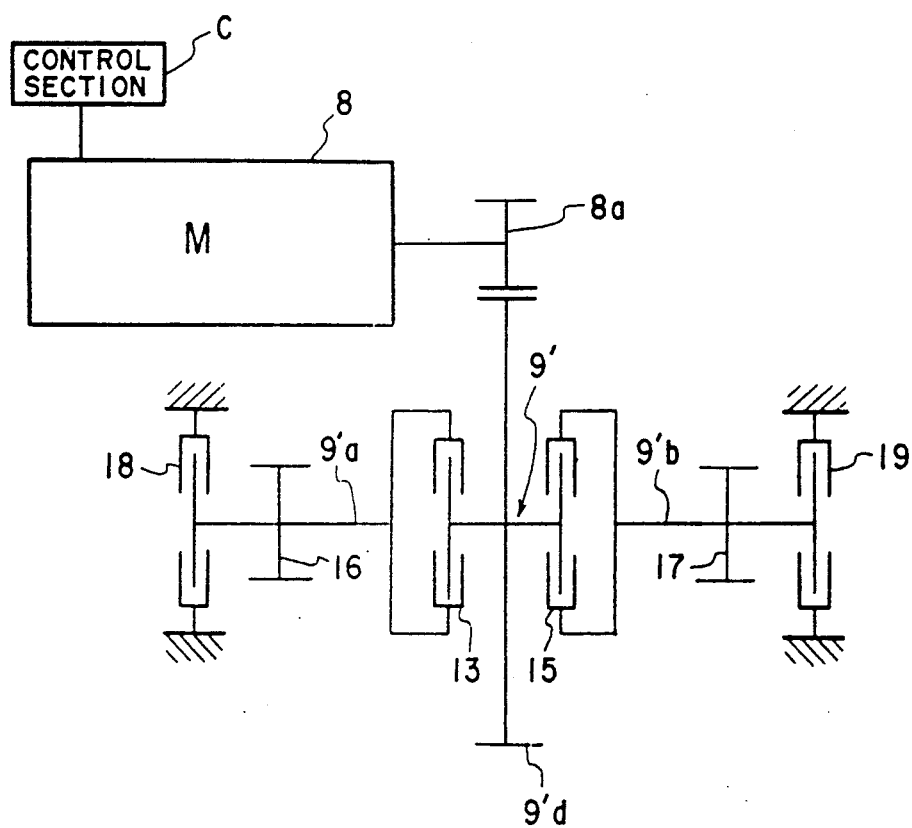
FIG. 2 is a schematic diagram of a divergence means in accordance with another embodiment of the present invention.

Another embodiment of the present invention based on a certain modification will be described below with reference to FIG. 2.

In this embodiment, shafts 9'a and 9'b extending from a gear 9'd to the left and right are used as divergence means for divergence and transmission from the electric motor 8 to the first and second gears 16 and 17. First and second clutches 13 and 15 are respectively interposed between the gear 9'd and the shafts 9'a and 9'b extending therefrom to the left and right, and the gears 16 and 17 and retaining brakes 18 and 19 are respectively provided on the transmission downstream sides of the clutches 13 and 15. Preferably, the first and second clutches 13 and 15 are electromagnetic clutches controlled by electrical signals from the control section C. Also, preferably, the retaining brakes 18 and 19 are electromagnetic brakes but may be any other engagement means such as hydraulic clutches or brakes controlled by solenoid valves.

In the non-operated state, in accordance with this embodiment, the left and right retaining brakes 18 and 19 are in engaged states, the gears 16 and 17 are in fixed states, and the gear 55 of the ball screw mechanism 5 for the continuously variable speed transmission and the gear 61 of the ball screw mechanism 6 for the forward/reverse rotation changeover mechanism engaging with the gears 16 and 17 are retained in predetermined states. When under these conditions the control section C issues a forward/reverse rotation changeover signal, the electric motor 8 is rotated and the second clutch 15 is connected, thereby transmitting the torque of the output gear 8a to the gear 17 through the gear 9'd, the shaft 9'b and the second clutch 15. The gear 61 is thereby rotated to axially move the male screw part 6b of the ball screw mechanism 6, thereby setting the forward clutch C1 or the reverse brake B2 in the engaged state. When the control section C issues a non-stage speed change signal, the first clutch 13 is connected and the brake 18 is released, while the second clutch 15 is released and the brake 19 is maintained in the engaged state. Under these conditions, the electric motor 8 is rotated in a predetermined direction, and the torque of the electric motor 8 is transmitted to the gear 16 through the output gear 8a, the gear 9'd, the shaft 9'a and the first clutch 13 to rotate the gear 55, thereby axially moving the female screw part 52 of the continuously variable speed transmission ball screw mechanism 5.

Thus, the speed of the belt drive continuously variable speed transmission 1 is changed as desired, as in the case of the above-described arrangement.

Still another embodiment of the present invention will be described below with reference to FIGS. 7 and 8.

In this embodiment, the forward/reverse rotation changeover mechanism and the high/low speed mode changeover mechanism are operated with one motor, while in the above-described embodiments the belt drive continuously variable speed transmission and the forward/reverse rotation changeover mechanism are operated with one motor.

A continuously variable speed transmission A' of this embodiment has components corresponding to those of the above-described embodiments, i.e., the belt drive continuously variable transmission 1, the forward-/reverse rotation changeover mechanism 2 having the dual planetary gear 90, the high/low speed mode changeover mechanism 3 including the single planetary gear mechanism 40 and the transfer device 41, the starting device 110 and the output member 170. This embodiment differs from the former embodiments in that a high/low speed mode changeover mechanism actuator 7' is constituted by a mechanical actuator. Components identical or corresponding to those of the above-described embodiments are indicated by the same reference symbols and the description for them will not be repeated.

Figure 7:
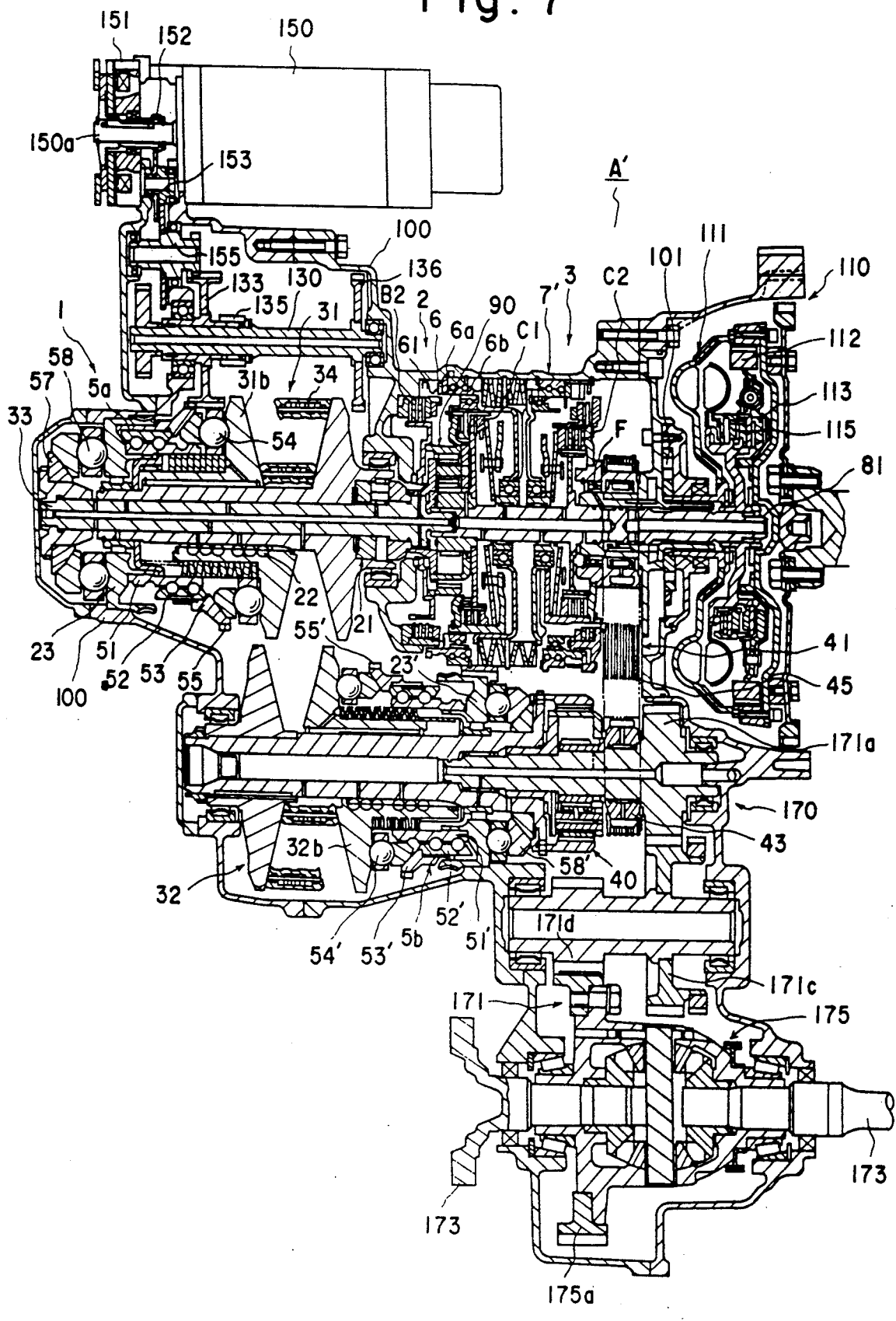
FIG. 7 is a cross-sectional view of the whole of a continuously variable speed transmission in accordance with still another embodiment of the present invention.
Figure 8:
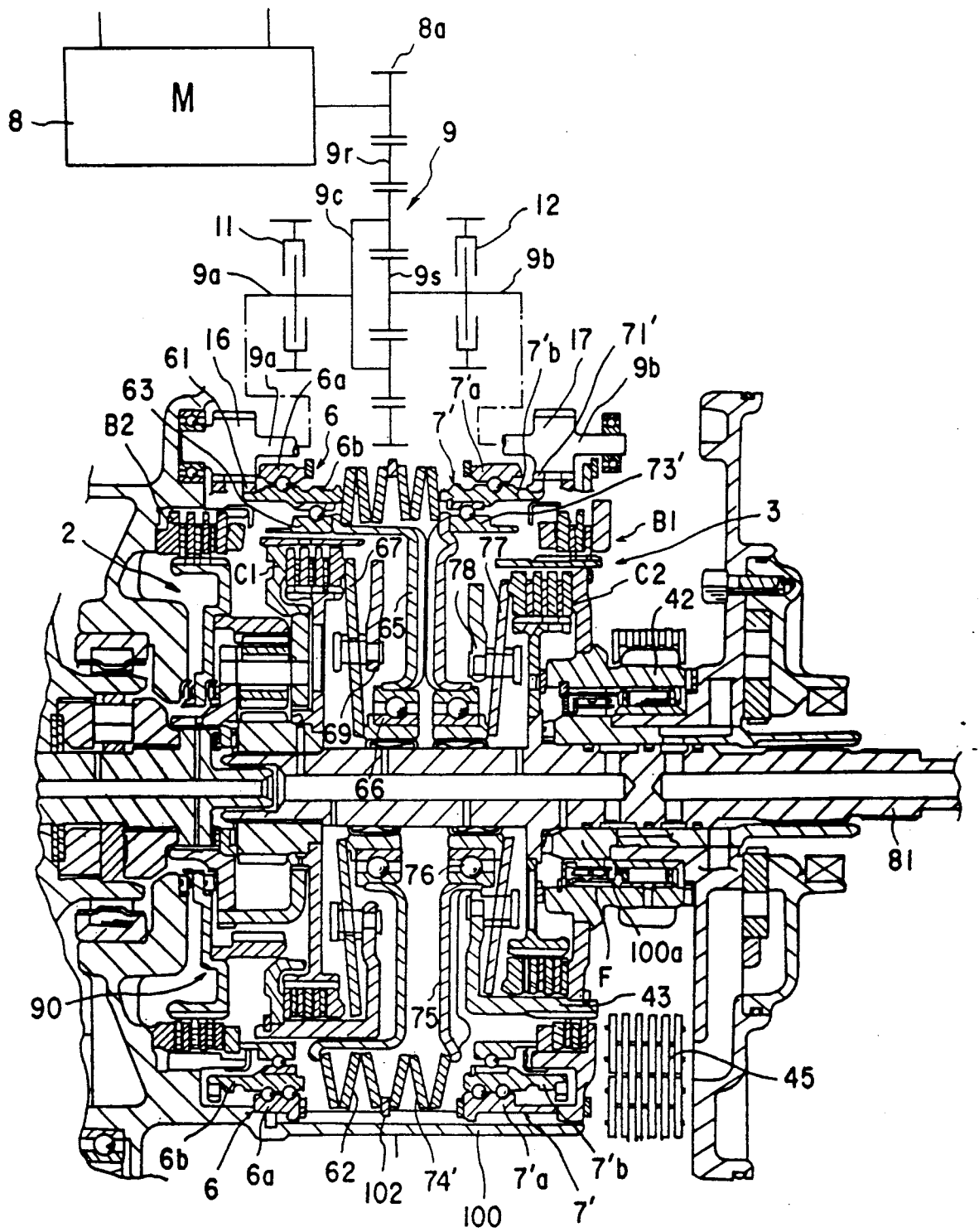
FIG. 8 is a cross-sectional view of a forward/reverse changeover mechanism and a high/low speed mode changeover mechanism shown in FIG. 7.

The continuously variable speed transmission A' has an electric motor 150 for continuous speed change control, as shown in FIG. 7. The electric motor 150 is capable of being rotated by electric signals from the control section and has an electromagnetic brake 151 which enables an output shaft 151a to be retained in a suitable position. A gear 152 fixed to the output shaft 150a of the electric motor 150 is linked to the gear 133 on the countershaft 130 through a pair of large and small spur gears provided on a pair of countergear units 153 and 155 to rotate the gear 133 at a reduced speed.

When the electromagnetic brake 151 is released and the electric motor 150 is rotated based on a speed change command from the control section, the torque of the motor is transmitted through the gear units 153 and 155, and the torque of revolutions thereby reduced is transmitted to the large gear 133. The large gear 133 rotates and axially moves the female screw part 52 of the ball screw mechanism 5a on the primary side by meshing with the gear 55 thereof. Also, as shown in FIG. 4, the torque of the large gear 133 is transmitted to the gear 55' of the ball screw mechanism 5b on the secondary side through the small gear 135, the large gear 137, the non-circular gears 142 and 141, the first countershaft 130, the large gear 136, the small gear 139 and the large gear 140 to rotate and axially move the female screw part 52' of the ball screw mechanism 5b. The movable sheaves 31b and 32b are thereby moved axially to adjust the effective diameters of the belt portions on the pulleys 31 and 32 as desired.

The high/low speed mode changeover mechanism actuator 7' is constituted by a ball screw mechanism similar to the forward/reverse rotation changeover mechanism actuator 6. A female screw part 7'a of the actuator 7 is fixed to the case 100 with respect to rotational and axial directions, and a male screw part 7'b meshes with the female screw part 7'a and is movable in rotational and axial directions. A gear 71' is fixed to the male screw part 7'b, and an annular member 73' is connected to an inner peripheral surface of the male screw part 7'b with a ball bearing interposed therebetween so as to be movable in the rotational direction only. One end of the annular member 73' extends axially to constitute a member for operating the low-coast and reverse brake B1, and a group of return disc springs 74' fixed at one side on a snap spring 102 abuts against the other end of the annular member 73'. Also, a connection member 75 is fixed to the other end of the annular member 73'. The connection member 75 extends radially inward and is connected and fixed at its extreme end to an outer race of a ball bearing 76 which is supported on the input shaft 81 with a needle bearing interposed therebetween so as to be movable rotatably and axially. An inner end portion of an engagement disc spring 77 abuts against an inner race of the ball bearing 76. The engagement disc spring 77 is supported at its intermediate portion by a support member 78 which is fixed to the drum member 43 of the high clutch C2. An outer peripheral end portion of the engagement disc spring 77 abuts against the high clutch C2 to urge and connect the same when no force is applied from the ball bearing 76 to the disc spring 67. As in the above-described embodiment, the urging force of the return disc springs 74' is set to be larger than that of the engagement disc spring 77. Accordingly, when the ball screw mechanism 7' supplies no propulsive force, the return disc springs 74' prevail over the engagement disc spring 77 to maintain the high clutch C2 in a released state.

The electric motor 8 for the forward/reverse rotation changeover mechanism 2 and the high/low speed changeover mechanism 3 is fixed outside the case 100. The output gear 8a of the electric motor 8 meshes with the ring gear 9r of the planetary gear 9, as in the case of the arrangement shown in FIG. 1. The carrier 9c of the planetary gear 9 is connected to the shaft 9a, while the sun gear 9s is connected to the second shaft 9b. The first brake 11 and the gear 16 are provided on the shaft 9a, and the gear 16 always meshes with the gear 61 of the ball screw mechanism 6 for the forward/reverse rotation changeover mechanism 2. The second brake 12 and the gear 17 are provided on the shaft 9b, and the gear 17 always meshes with the gear 71' of the high/low speed mode changeover mechanism 3.

The thus-constructed embodiment operates as described below. When the driver moves the shift lever from the neutral position N to the position of the range D, the first brake 11, among the brakes in the engaged states and the electric motor 8 are rotated in a predetermined direction. Then the torque of the output gear 8a is transmitted to the gear 16 through the carrier 9c of the planetary gear 9 and further to the male screw part 6b of the ball screw mechanism 6 through the gear 61, thereby moving the male screw part 6b to the left as viewed in the figures. The engagement disc spring 67 thereby urges and connects the forward clutch C1 to set the forward/reverse rotation changeover mechanism 2 in the forward running position, as described above. In this state, the electric motor 8 is stopped and the first brake 11 is maintained in the engaged state. At this time, the low speed mode is selected in which the ball screw mechanism 7' for the high/low speed mode changeover mechanism is in the home position, both the low-coast and reverse brake B1 and the high clutch C2 are in the released states, and only the low one-way clutch F is actuated.

If the vehicle speed and the throttle opening are increased to predetermined high speed levels, the second brake 12 is released and the electric motor 8 is rotated in a predetermined direction. Then the torque of the output gear 8a is transmitted to the gear 71' through the sun gear 9s of the planetary gear 9 and the gear 17, thereby moving the male screw part 7'b of the ball screw mechanism 7' for the forward/reverse rotation changeover mechanism to the left as viewed in the figures. The engagement disc spring 77 urges and engages the high clutch C2 as described above to make the high/low speed mode changeover mechanism 3 select the high speed mode.

If the driver further moves the shift lever to the position of the range S, the second brake 12 is released and the electric motor 8 is rotated in the direction opposite to that in the above. The male screw part 7'b of the ball screw mechanism 7' is moved to the right as viewed in the figures, thereby setting the low-coast and reverse brake B1 is in the engaged state. If a predetermined high speed condition is established during operation in the range S, the second brake 12 is released and the electric motor 8 is rotated in a predetermined direction, as in the case of forward running. The male screw part 7'b of the ball screw mechanism 7' is moved to the left as viewed in the figures, thereby releasing the low-coast and reverse brake B1 and engaging the high clutch C2.

If the driver moves the shift lever to the range R, the first and second brakes 11 and 12 are released and the electric motor 8 is rotated in the opposite direction. Then the torque of the output gear 8a is distributed to the carrier 9c and the sun gear 9s of the planetary gear 9 at a predetermined torque ratio, and the distributed torques are respectively transmitted to the ball screw mechanism 6 for the forward/reverse rotation changeover mechanism and the ball screw mechanism 7' for the high/low speed mode changeover mechanism through the left and right gears 16 and 17 and the gears 61 and 71'. The male screw parts 6b and 7'b are thereby moved to the right as viewed in the figure. When one of these male screw parts, e.g., the male screw part 6b of the forward/reverse rotation changeover mechanism is inhibited from moving by exceeding a certain extent as the reverse brake B2 is safely engaged, the whole torque is distributed to the other male screw part, i.e., the male screw part 7'b of the actuator 7 for the high/low speed mode changeover mechanism, thereby rapidly establishing the completely engaged state of the low-coast and reverse brake B1.

In this embodiment, the means for operating the forward/reverse rotation changeover mechanism 2 and the high/low speed mode changeover mechanism 3 is constituted by the one shown in FIG. 1. Needless to say, this operating means may be constituted by the one shown in FIG. 2.

In the above-described embodiments, two mechanical actuators are driven by one electric motor 8 but other type of driving system are also applicable. For example, another divergence means such as a planetary gear may be provided on the transmission downstream side of the divergence means, e.g., the planetary gear 9 (e.g., on the shaft 9b) to drive three or more mechanical actuators.

In the above-described embodiments, the present invention is applied to the continuously variable speed transmissions A and A', but it may be applied to other types of transmissions or mechanisms. For example, it may be applied to a continuously variable speed transmission having a forward/reverse rotation changeover mechanism and a belt drive continuously variable speed transmission in such a manner that the forward/reverse rotation changeover mechanism and the belt drive continuously variable speed transmission are operated with mechanical actuators driven by one motor, or it may be applied to changeover of a clutch or brake of a continuously variable speed automatic transmission having a transmission mechanism with a planetary gear.

As described above, the present invention is free from various problems resulting from the use of hydraulic pressure because a plurality of mechanical actuators 5 and 6 or 6 and 7' are driven by one electric motor 8. The number of motors and the number of devices for controlling the motors can be remarkably reduced, and the transmission can therefore be rendered compact while being simplified in layout.

Specifically, in the case where the belt drive continuously variable speed transmission 1 and the forward/reverse rotation changeover mechanism 2 are operated with the mechanical actuators 5 and 6 driven by one electric motor 8, the changeover means 11, 12, 13, and 15 and the electric motor 8 can be easily controlled and the size of the motor and the controller can be comparatively reduced, because the belt drive continuously variable speed transmission 1 and the forward/reverse rotation changeover mechanism 2 have no functions activated simultaneously for the operation of the continuously variable speed transmission A. The forward/reverse rotation changeover mechanism 2 is operated during engine idling but no hydraulic pressure is used for the actuator for this mechanism. For this reason, even if an oil pump is required for other actuators, the capacity and the discharge pressure of the pump can be restricted, thereby minimizing the possibility of occurrence of oil leaks or oil pump loss.

In the case where the forward/reverse rotation changeover mechanism 2 and the high/low speed mode changeover mechanism 3 are operated with the mechanical actuators 6 and 7' driven by one electric motor 8, the mechanical actuators 6 and 7' can be disposed in adjacent positions. Also, the positional relationship between the power transmitting mechanism, divergence means 9 and the changeover means 11 and 12 relative to the electric motor 8 can be simplified, thereby enabling the layout of the whole of the continuously variable speed transmission A' to be simplified and suitably arranged.

In the case where the planetary gear 9 constitutes the divergence means for distributing the torque of one electric motor 8 to a plurality of mechanical actuators, brakes suffice for the changeover means 11 and 12, there is no need for the brake for retaining the electric motor 8 at desired rotational positions, and the structure relating to this means can be simplified. During transmission of torque form the planetary gear 9 to the mechanical actuator 5 and 6 or 6 and 7', if the operation of one of the two transmission sections is completed, the whole torque can be automatically transmitted to the other transmission operation section. Thus, the mechanical actuators can be controlled simultaneously without requiring control of complicate changeover timings.

In the case where the direct power transmission means 9' in the form of a shaft, gear or chain constitutes the divergence means, the structure of the divergence means can be simplified, and the transmission can therefore be rendered compact and simplified in layout.

If the electric motor 8 and the changeover means 11, 12, 13, and 15 are directly controlled by electrical signals from the control section C instead of being controlled through hydraulic pressures, the control can be effected promptly with improved accuracy.

It is to be construed that the present invention is not limited to the above-described embodiments and that it can be modified in various ways based on its gist without departing from the scope set forth in the appended claims.

What we claim is:

1. A transmission including a belt drive continuously variable speed transmission and a forward/reverse rotation changeover mechanism, said belt drive continuously variable speed transmission and said forward/reverse rotation changeover mechanism being controlled responsive to, signals from a controller, said transmission comprising:
   (a) a plurality of mechanical actuators for converting input torques into thrust forces for operation of said belt drive continuously variable speed transmission and said forward/reverse rotation changeover mechanism;
   (b) a motor serving as a common source of said input torques received by said plurality of mechanical actuators;
   (c) divergence means for distributing and transmitting torque from said motor as said input torques to said plurality of mechanical actuators; and
   (d) engagement means for selective transmission of said input torques distributed from said divergence means to at least one of said plurality of mechanical actuators.

2. A transmission according to claim 1, wherein said divergence means comprises a planetary gear set having one element connected to said motor and two other elements connected to different mechanical actuators.

3. A transmission according to claim 2, wherein said engagement means includes brakes for braking said two other elements.

4. A transmission according to claim 1, wherein said divergence means includes means for direct power transmission.

5. A transmission according to claim 4, wherein said engagement means includes clutches respectively interposed between said direct power transmission means and said plurality of mechanical actuators.

6. A transmission according to claim 1, wherein said motor is an electric motor controlled by an electrical signal from said controller.

7. A transmission according to claim 1, wherein said engagement means includes an electromagnetic brake controlled by an electrical signal from said controller.

8. A transmission according to claim 1, wherein said engagement means includes a hydraulic brake.

9. A transmission according to claim 1, wherein said engagement means includes a hydraulic clutch.

10. A transmission according to claim 1, wherein at least one of said mechanical actuators is a ball screw mechanism and wherein said belt drive continuously variable speed transmission comprises a moveable sheave and a fixed sheave constituting a pulley around which said belt drive runs, said one mechanical actuator operating to move said moveable sheave to change the effective diameter of said pulley.

11. A transmission according to claim 4, wherein said means for direct power transmission comprises a shaft.

12. A transmission including a transmission unit, a forward/reverse rotation changeover mechanism, and a high/low speed mode changeover mechanism, said transmission unit, said forward/reverse rotation changeover mechanism and said high/low speed mode changeover mechanism being controlled responsive to signals from a controller, said transmission comprising:
   (a) a motor serving as a torque generation source; and
   (b) mechanical actuators driven by said motor to operate said forward/reverse rotation changeover mechanism and said high/low speed mode changeover mechanism.

13. A transmission according to claim 12, wherein said motor is an electric motor controlled by an electrical signal from said controller.

14. A transmission according to claim 9 further comprising:
   (c) divergence means for distributing and transmitting said torque generated by said motor as input torques to said mechanical actuators; and
   (d) engagement means for selectively transmitting said input torques distributed from said divergence means to at least one of said mechanical actuators.

15. A transmission according to claim 14, wherein said engagement means includes an electromagnetic brake controlled by an electrical signal from said controller.

16. A transmission according to claim 14, wherein said engagement means includes a hydraulic brake.

17. A transmission according to claim 14, wherein said engagement means includes a hydraulic clutch.

18. A transmission according to claim 12, wherein at least one of said mechanical actuators is a ball screw mechanism.

* * * * *

UNITED STATES PATENT AND TRADEMARK OFFICE
CERTIFICATE OF CORRECTION

PATENT NO.  : 5,052,990
DATED       : October 1, 1991
INVENTOR(S) : SAKAKIBARA et al It is certified that error appears in the above-indentified patent and that said Letters Patent is hereby corrected as shown below:

Column 2, line 60, delete "the" and insert ––a––.
Column 4, line 5, "cross sectional" should read ––cross-sectional––.

line 64, "symbol    " should read ––symbol  ––.

Col. 9, line 23, "On" should begin a new paragraph;

line 55, "/70a" should read ––170a––.

Col. 14, line 61, "position and," should read ––position,––.

Col. 19, line 18, delete "is".

Col. 21, line 16, after "to" delete the comma ",".
Col. 22, line 33, "9" should read ––12––.

Signed and Sealed this

Twenty-fifth Day of October, 1994

Attest:

BRUCE LEHMAN

*Attesting Officer*     *Commissioner of Patents and Trademarks*